United States Patent
Kaushik et al.

(10) Patent No.: US 11,782,783 B2
(45) Date of Patent: Oct. 10, 2023

(54) METHOD AND APPARATUS TO NEUTRALIZE REPLICATION ERROR AND RETAIN PRIMARY AND SECONDARY SYNCHRONIZATION DURING SYNCHRONOUS REPLICATION

(71) Applicant: NetApp Inc., San Jose, CA (US)

(72) Inventors: Akhil Kaushik, Bangalore (IN); Anoop Chakkalakkal Vijayan, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/492,944

(22) Filed: Oct. 4, 2021

(65) Prior Publication Data
US 2022/0100600 A1  Mar. 31, 2022

Related U.S. Application Data

(63) Continuation of application No. 16/288,469, filed on Feb. 28, 2019, now Pat. No. 11,138,061.

(51) Int. Cl.
*G06F 16/27* (2019.01)
*G06F 11/16* (2006.01)
*G06F 11/07* (2006.01)

(52) U.S. Cl.
CPC ........ *G06F 11/0793* (2013.01); *G06F 11/165* (2013.01); *G06F 16/275* (2019.01); *G06F 11/0727* (2013.01)

(58) Field of Classification Search
CPC .............................. G06F 16/275; G06F 11/165
See application file for complete search history.

(56) References Cited

U.S. PATENT DOCUMENTS 7,707,136 B2   4/2010  Vosshall et al.
8,285,956 B2  10/2012  Ozdemir
(Continued)

FOREIGN PATENT DOCUMENTS

JP    3748339 B2    2/2006
JP    4935901 B2    5/2012
WO   2014008495 A2  1/2014

OTHER PUBLICATIONS

Final Office Action dated Apr. 5, 2023 for U.S. Appl. No. 17/344,805, filed Jun. 10, 2021, 9 pages.
(Continued)

*Primary Examiner* — Dangelino N Gortayo
(74) *Attorney, Agent, or Firm* — COOPER LEGAL GROUP, LLC

(57) ABSTRACT

Techniques are provided for neutralizing replication errors. An operation is executed upon a first storage object and is replicated as a replicated operation for execution upon a second storage object. A first error may be received for the replicated operation. Instead of transitioning to an out of sync state and aborting the operation, a wait is performed until a result of the attempted execution of the operation is received. If the first error is the same as a second error returned for the operation, then the operation and replicated operation are considered successful and a synchronous replication relationship is kept in sync. If the first error and the second error are different errors, then an error response is returned for the operation and the synchronous replication relationship is transitioned to out of sync.

20 Claims, 8 Drawing Sheets

(56) References Cited

U.S. PATENT DOCUMENTS

| | | |
|---|---|---|
| 9,933,945 B1 | 4/2018 | Mao et al. |
| 10,331,695 B1* | 6/2019 | Stickle .................. G06F 16/27 |
| 10,409,807 B1* | 9/2019 | Pareek .................. G06F 16/27 |
| 10,496,320 B2 | 12/2019 | Eisler et al. |
| 10,503,606 B2 | 12/2019 | Hsieh et al. |
| 10,552,469 B2 | 2/2020 | Natbee et al. |
| 10,564,946 B1 | 2/2020 | Wagner et al. |
| 10,599,671 B2* | 3/2020 | Dorman .................. G06F 16/27 |
| 10,725,691 B1 | 7/2020 | Kaushik et al. |
| 10,761,768 B1 | 9/2020 | Kaushik et al. |
| 10,852,985 B2 | 12/2020 | Narasingarayanapeta |
| 11,036,423 B2 | 6/2021 | Kaushik et al. |
| 11,138,061 B2 | 10/2021 | Kaushik et al. |
| 11,593,016 B2 | 2/2023 | Kaushik et al. |
| 2004/0250030 A1 | 12/2004 | Ji et al. |
| 2005/0283658 A1 | 12/2005 | Clark et al. |
| 2006/0020754 A1 | 1/2006 | Suzuki et al. |
| 2009/0307166 A1 | 12/2009 | Routray et al. |
| 2009/0307453 A1 | 12/2009 | Benhase et al. |
| 2010/0037231 A1 | 2/2010 | Chen et al. |
| 2010/0049926 A1 | 2/2010 | Fuente et al. |
| 2010/0076930 A1 | 3/2010 | Vosshall et al. |
| 2012/0303576 A1 | 11/2012 | Calder et al. |
| 2012/0310883 A1 | 12/2012 | Akirav, II et al. |
| 2014/0040206 A1 | 2/2014 | Ramakrishnan et al. |
| 2014/0143789 A1 | 5/2014 | Nadathur et al. |
| 2014/0358858 A1* | 12/2014 | Gamble ............. G06F 11/1458 |
| | | 707/634 |
| 2015/0186485 A1 | 7/2015 | Guo et al. |
| 2015/0331760 A1 | 11/2015 | Dalessandro et al. |
| 2016/0041885 A1* | 2/2016 | Arai .................... G06F 11/1471 |
| | | 707/625 |
| 2016/0224609 A1 | 8/2016 | Seekircher et al. |
| 2016/0328436 A1 | 11/2016 | Govind |
| 2017/0060702 A1* | 3/2017 | Dave ................... G06F 11/2094 |
| 2017/0161350 A1 | 6/2017 | Calder et al. |
| 2017/0242599 A1 | 8/2017 | Patnaik et al. |
| 2017/0242603 A1 | 8/2017 | Sundararajan et al. |
| 2017/0308602 A1 | 10/2017 | Raghunathan et al. |
| 2017/0315874 A1 | 11/2017 | Patnaik et al. |
| 2017/0322966 A1 | 11/2017 | Tran et al. |
| 2018/0039538 A1 | 2/2018 | Freikorn et al. |
| 2018/0046565 A1 | 2/2018 | Lu et al. |
| 2018/0121302 A1 | 5/2018 | Miller et al. |
| 2019/0034287 A1 | 1/2019 | Hsieh et al. |
| 2019/0197174 A1* | 6/2019 | Kim ...................... G06F 16/258 |
| 2019/0342146 A1 | 11/2019 | Magcale |
| 2020/0042536 A1 | 2/2020 | Kaushik et al. |
| 2020/0278984 A1 | 9/2020 | Kaushik et al. |
| 2020/0310653 A1 | 10/2020 | Kaushik et al. |
| 2021/0303165 A1 | 9/2021 | Kaushik et al. |

OTHER PUBLICATIONS

Non Final Office Action dated Jun. 14, 2023 for U.S. Appl. No. 18/092,533, filed Jan. 3, 2023, 28 pages.

Zhang I., et al.," When Is Operation Ordering Required in Replicated Transactional Storage,"Bulletin of the IEEE Computer Society Technical Committee on Data Engineering, (IEEE),2016, 12 Pages.

* cited by examiner

METHOD AND APPARATUS TO NEUTRALIZE REPLICATION ERROR AND RETAIN PRIMARY AND SECONDARY SYNCHRONIZATION DURING SYNCHRONOUS REPLICATION

RELATED APPLICATIONS

This application claims priority to and is a continuation of U.S. application Ser. No. 16/288,469, filed on Feb. 28, 2019, titled "METHOD AND APPARATUS TO NEUTRALIZE REPLICATION ERROR AND RETAIN PRIMARY AND SECONDARY SYNCHRONIZATION DURING SYNCHRONOUS REPLICATION," which is incorporated herein by reference.

BACKGROUND

Many storage systems may implement data replication and/or other redundancy data access techniques for data loss protection and non-disruptive client access. For example, a first computing device may be configured to provide clients with primary access to data stored within a first storage device and/or other storage devices. A second computing device may be configured as a backup for the first computing device in the event the first computing device fails. Data may be replicated from the first computing device to the second computing device. In this way, the second computing device can provide clients with access to replicated data in the event the first computing device fails.

One type of replication is asynchronous replication. When the first computing device receives an operation from a client device, the first computing device transmits a replication of the operation to the second computing device for execution. Irrespective of whether the second computing device has executed the replicated operation, the first computing device will transmit an acknowledgment of successful performance of the operation to the client device once the first computing device has executed the operation.

Another type of replication is synchronous replication, which provides a greater level of data protection guarantees, such as a zero recovery point objective (RPO). This is because the first computing device does not transmit the acknowledgment until the operation has been executed by the first computing device and the replicated operation has been executed or acknowledged by the second computing device. In this way, two copies of data and/or metadata resulting from the operation are maintained before the client receives acknowledgment that the operation was successful.

DETAILED DESCRIPTION

Figure 1:
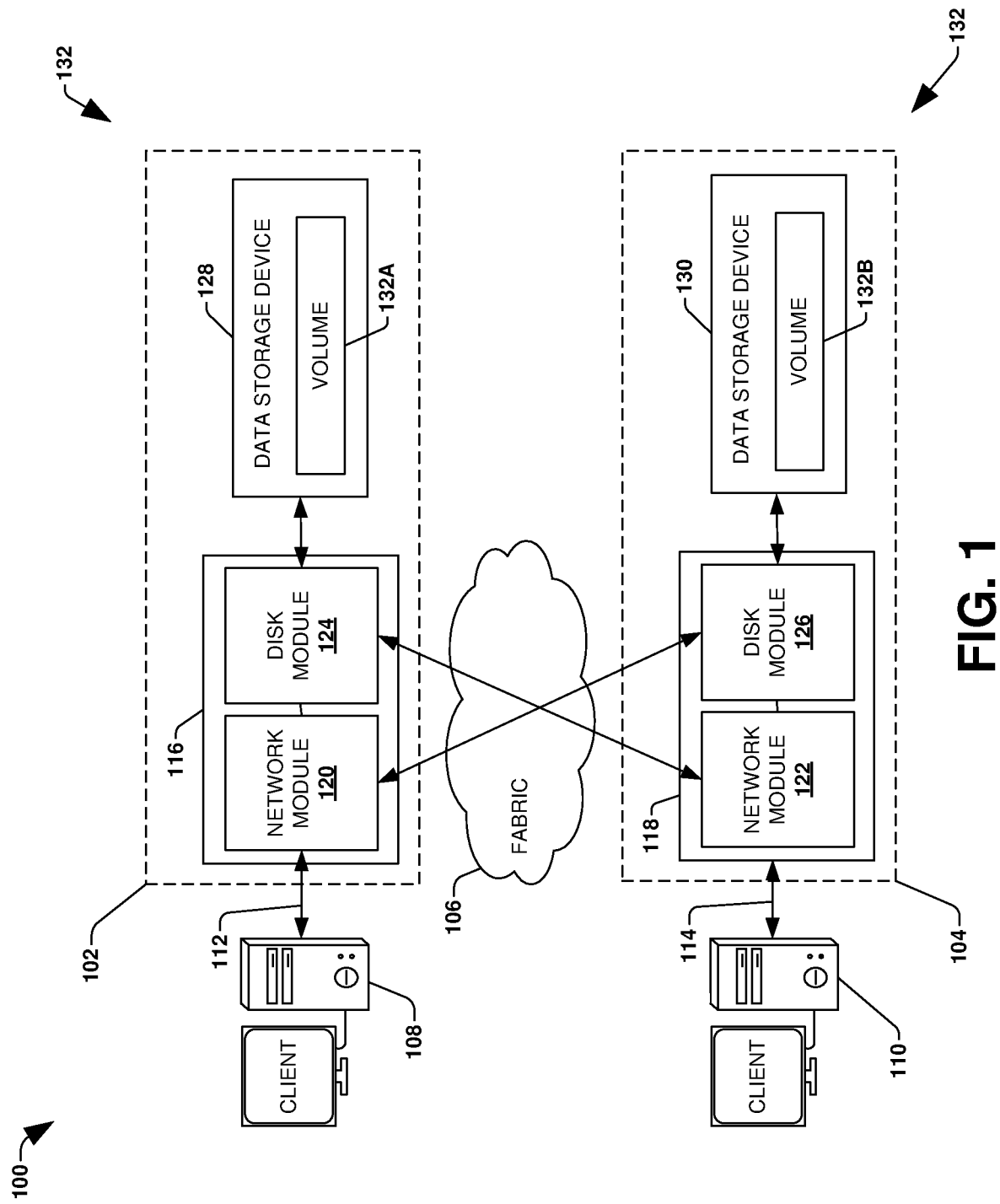
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

In asynchronous replication, incremental changes to a storage object, such as a volume, a file, a directory, a defined set of files or directories, a file system, or a storage virtual machine comprising a plurality of volumes stored across one or more nodes of a cluster, are replicated from the storage object to a replicated storage object. In synchronous replication, when an operation is received from a client device (e.g., a write operation targeting the storage object), the operation is split to create a replicated operation that is a replication of the operation. The operation is executed upon the storage object, such as by a first computing device managing the storage object. The replicated operation is executed upon the replicated storage object, such as by a second computing device managing the replicated storage object. The operation is not acknowledged to the client device as being complete until both the operation and the replicated operation have successfully been executed upon the storage object and the replicated storage object.

Accordingly, methods and/or systems are provided herein that improve synchronous replication by dynamically allocating and recycling file range locks, neutralizing replication errors without going out of sync, and handling misaligned holes and writes beyond an end of file during a quick reconcile process. Synchronous replication may be implemented for first storage object hosted by a first computing environment (e.g., a first node) and a second storage object hosted by a second computing environment (e.g., a second node) as a replica of the first storage object. A synchronous replication relationship is established between the first storage object and the second storage object.

In an embodiment of dynamically allocating and recycling file range locks, overlapping writes can occur where multiple parallel writes (e.g., inflight write operations not yet fully executed and replicated) target overlapping ranges of the first storage object. The order that the overlapping writes are executed upon the first storage object needs to be maintained when replicated to the second storage object. Otherwise a divergence will occur between the first storage object and the second storage object. Order of execution is preserved at the second storage object by serializing the overlapping writes using a range lock. A single range lock is used per storage object (per file). However, this does not scale well for storage environments having a large number of files. Accordingly, the present system can dynamically allocate and recycle range locks as needed in order to scale to storage environments having large numbers of files.

An overlapping write manager is used to maintain the order of execution of writes between the first storage object and the second storage object using range locks. In an example, an overlapping write manager allocator is setup and used to pre-allocate a percentage of a total number of overlapping write managers to be available for managing overlapping writes targeting files of the first computing environment (e.g., the first storage object managed by the first node) and replicated to replicate files stored by the second computing environment (e.g., the second storage object managed by the second node).

In an embodiment of pre-allocating overlapping write managers, when an outstanding allocation of overlapping write managers (e.g., overlapping write managers being used by incoming writes) grows beyond a threshold (e.g., 10%, 20%, etc.), then additional overlapping write managers are allocated for use by overlapping writes.

A mapping is used to track allocated overlapping write managers. The mapping comprises file handles of files for which allocated overlapping write managers have ben pre-allocated (drawn) from the overlapping write manager allocator, and thus are available for use to obtain range locks for corresponding files. File handles are used as a key to the mapping. When I/O to a file is received, the mapping is search using a file handle of the file to see if an overlapping write manager for the file handle of the file is already allocated. For example, the mapping is evaluated using a file handle of a file targeted by an incoming write to determine whether an overlapping write manager is already allocated for the file handle.

If the overlapping write manager is already allocated, then the overlapping write manager is utilized to acquire a range lock for a range of the file to be modified by the incoming write. The incoming write is serially executed upon the file and is serially replicated to a replicated file using the range lock (e.g., the replicate file maintained as a replica of the file). In this way, the range lock is used to block overlapping writes targeting at least a portion of the range of the file targeted by the incoming write (e.g., overlapping replicated writes targeting the replicated file). If the mapping does not comprise an entry for the file handle, then there is no pre-allocated overlapping write manager for the file handle. Thus, a new overlapping write manager is allocated by the overlapping write manager allocator. The incoming write uses the new overlapping write manager to obtain a range lock for the range of the file for serial execution and replication. A new entry is created within the mapping to track the new overlapping write manager allocated for the file handle.

In an embodiment, overlapping write managers are recycled to return overlapping write managers back to the overlapping write manager allocator. For example, once the incoming write operation has completed execution upon the file and completed replication to the replicated file, the range lock is released. The overlapping write manager becomes available for use by other writes. If no outstanding writes having range locks for the file, then the entry is removed from the mapping for the overlapping write manager and the overlapping write manager is deallocated. If there are no outstanding writes having references to the overlapping write manager (e.g., there are no writes attempting to acquire range locks for the file), then the entry is removed from the mapping for the overlapping write manager and the overlapping write manager is deallocated.

During recycling of overlapping write managers, an entry for an overlapping write manager is removed from the mapping and the overlapping write manager is returned to a free pool of pre-allocated overlapping write managers. In an embodiment of recycling overlapping write managers, overlapping write managers are deallocated until a number of allocated overlapping write managers is less than a threshold, which reduces an allocation percentage. In an embodiment, the total number of overlapping write managers is maintained within the pool. A number of allocated overlapping write managers is reduced from the pool such as during recycling to free computing resources (e.g., recycling stops when an allocation percentage is low such as 20%).

In an embodiment, replication errors for synchronous replication are neutralized. A first storage object is maintained by a first computing environment and a second storage object is maintained by a second computing environment as a replica of the first storage object. An operation is received while the first storage object and the second storage object are in a synchronous replication state. The operation is executed upon the first storage object and is replicated as a replicated operation for execution upon the second storage object.

The second computing environment may return a first error for the replicated operation. The first error may indicate that the replicated operation did not successfully execute, such as due to a file system error (e.g., the replicated operation targets a file handle that is stale because a targeted file has been delete; the replicated operation would increase a size of a file beyond a supported file size; etc.). Upon receiving the first error for the replicated operation, the operation is refrained from being aborted from being executed upon the first storage object (e.g., the operation would normally be aborted due to the first error). The first storage object and the second storage object are refrained from being transitioned to an out of sync state based upon the first error. The synchronous replication would normally be transitioned to an out of sync state, and thus a zero recovery point objective (RPO) provided by synchronous replication would be disrupted.

Synchronous replication waits until both the operation and the replicated operation have finished. A second error may be received for the operation from the first computing environment. If the first error and the second error are the same error, then the replicated operation is deemed to be successfully completed so that the synchronous replication is maintained and not transitioned to the out of sync state. Accordingly, the first storage object and the second storage object are maintained in a synchronous replication state. The same error is returned to the client device as the operation was a failure from client device's perspective. However, if the first error and the second error are different errors, the first storage object and the second storage object could be different (inconsistent) due to different results from the different errors. The synchronous replication state will be transitioned to an out of sync state. The client is responded to with the error from the first (primary) computing environment.

In an embodiment of handling situations where no response is returned for the replicated operation, the second computing environment maintains a failed ops cache of failed operations and error codes for each failed operation. Sequence numbers assigned to replicated operations are used as a key for the failed ops cache. If the first computing environment does not receive a response for the replicated operation, then a retry of the replicated operation with a same sequence number will be transmitted to the second computing environment. If a sequence number of the retry replicated operation is specified by an entry/mapping within the failed ops cache as mapping the replicated operation to an error code, then the error code is transmitted to the first computing environment. This is because the second computing environment already attempted to execute the replicated operation and the error code was generated. Thus, since the retry replicated operation is a retry of the replicated operation (e.g., the second computing environment may have attempted to return the error code for the replicated operation but a network failure cause the first computing device to not receive the error code and thus the first computing environment retried the replicated operation after a timeout period), the retry replicated operation is not executed and the error code is returned.

In an embodiment of performing a quick reconcile operation, misaligned holes and writes beyond an end of a storage object (e.g., an end of file of a file) are handled. The quick reconcile operation is performed if an operation fails to execute upon a first storage object and a replicated operation of the operation succeeds at executing upon a second storage object maintained as a replica of the first storage object. The quick reconcile operation is executed to read "old" data from the first storage object and write the "old" data from the first storage object to the second storage object (e.g., effectively undoing the execution of the replicated operation) so that the storage objects are consistent. When the data is being read from the first storage object, the data could have misaligned holes that do not start and/or end at an aligned offset, such as at 4 kb aligned offsets. Synchronous replication, such as the quick reconcile operation, cannot handle the misaligned holes because holes can only be punched at aligned offsets and lengths, such as at the 4 kb aligned offsets. Further, if the failed operation was a write operation to a range beyond an end of file, then the quick reconcile operation cannot read that data from the first storage object.

Accordingly, the present system is capable of handling misaligned holes and writes beyond an end of file (e.g., an end of a storage object). In an example of handling misaligned holes, a read operation is executed against the first storage object at an offset and length of a write operation during a quick reconcile process to reconcile the first storage object and the second storage object. For example, the write operation was successfully replicated to the second storage object but failed to execute against the first storage object. Thus, the read operation is performed to read "old" data from the first storage object to write to the second storage object so that the storage objects are consistent.

A read response of the read operation is evaluated to determine whether the read response has a misaligned hole. If the read response comprises the misaligned hole (e.g., a first I/O vector entry is a hole and a start offset is not 4 kb aligned or a last I/O vector entry is a hole and an end offset is not 4 k aligned), then the read request is modified to align the misaligned hole.

If the misaligned hole is due to the first I/O vector entry having a misaligned start offset, then the start offset is rounded down to a block size used to store the second storage object (e.g., to 4 kb). If the misaligned hole is due to the last I/O vector entry having a misaligned end offset, then the end offset is rounded up to a nearest aligned block size value (e.g., to 4kb) as a new length. The new read response (e.g., the "old" data read from the first storage object and modified to address any misaligned holes) is replicated to the second storage object.

In an example of handling writes beyond an end of file, the read response of the read operation is evaluated to determine whether an error code or length of read data indicates whether the read data is beyond an end of the first storage object. If the read response is completely beyond the end of the first storage object, then a truncate command with a size of the first storage object is executed upon the second storage object. A volume barrier or dependency graph is used to ensure that the truncate command is serially executed with respect to other inflight replicated operations targeting the second storage object.

If the read response is partially beyond the end of the first storage object, then data from a start offset until the end of file is read from the first storage object and replicated to the second storage object. A truncate command having a size of the first storage object is executed upon the second storage object. In an example, the replication of the data and the truncate command can be combined as a single command transmitted to the second computing environment for execution upon the second storage object. A flag or field within the command can be used to indicate that the truncate command is to be performed after the writing the replicate data. A volume barrier or dependency graph is used to ensure that the command such as the truncate command is serially executed with respect to other inflight replicated operations targeting the second storage object.

To provide for neutralizing replication errors, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that neutralizing replication errors may be implemented within the clustered network environment 100. In an example, operations may be executed at node 116 and replayed at node 118. It may be appreciated that neutralizing replication errors may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
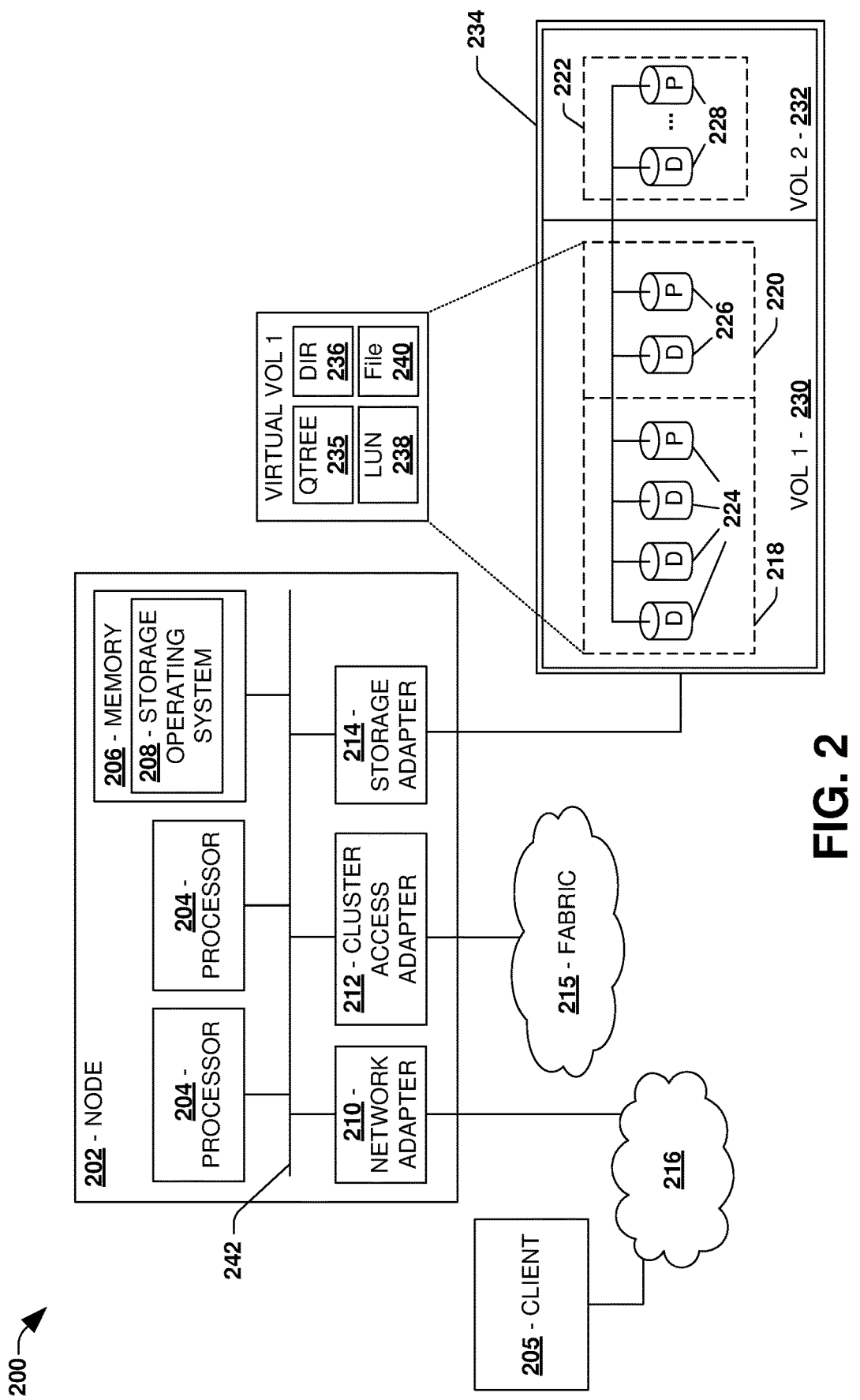
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that neutralizing replication errors may be implemented for the data storage system 200. It may be appreciated that neutralizing replication errors may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
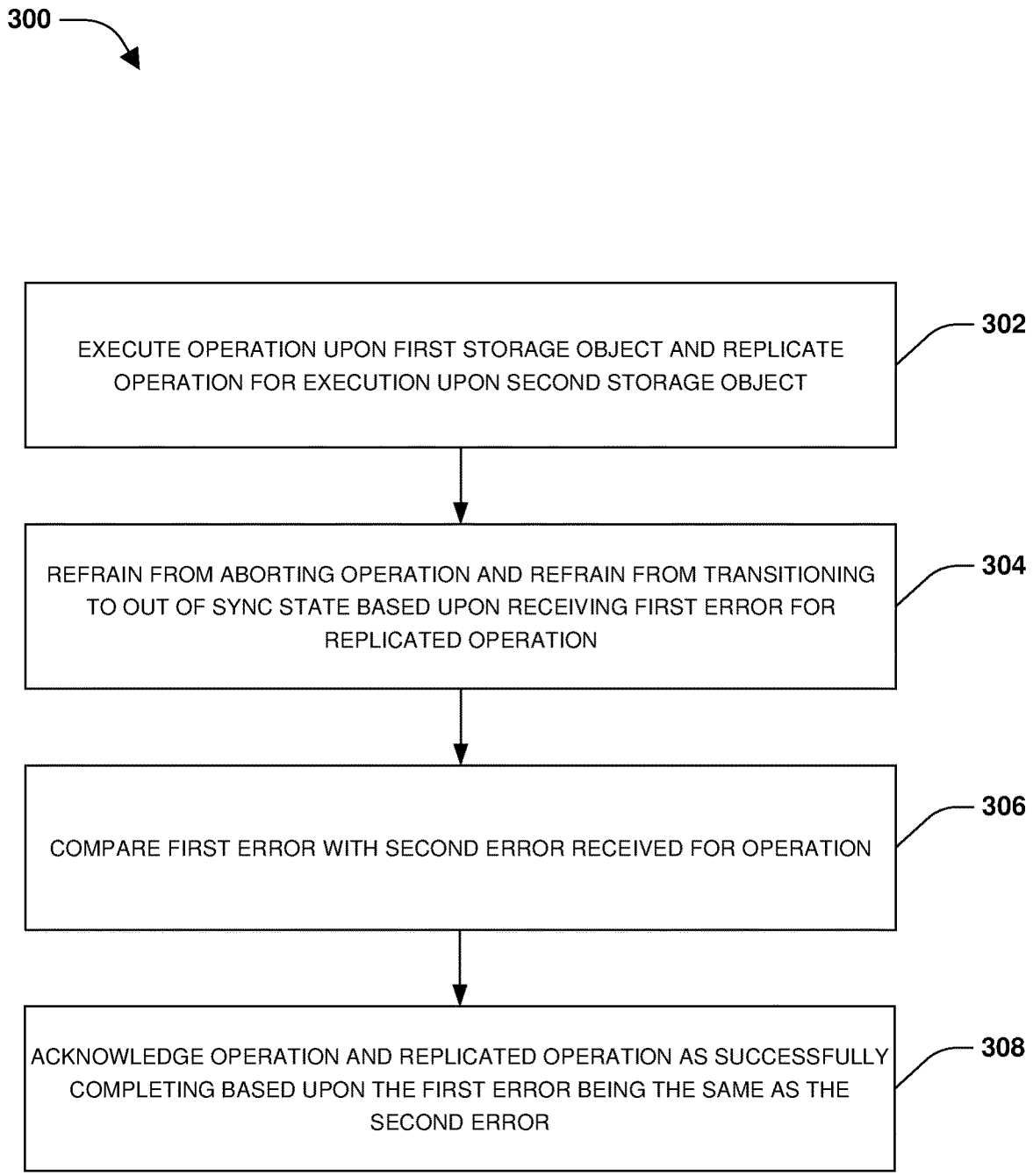
FIG. 3 is a flow chart illustrating an example method for neutralizing replication errors.
Figure 4A:
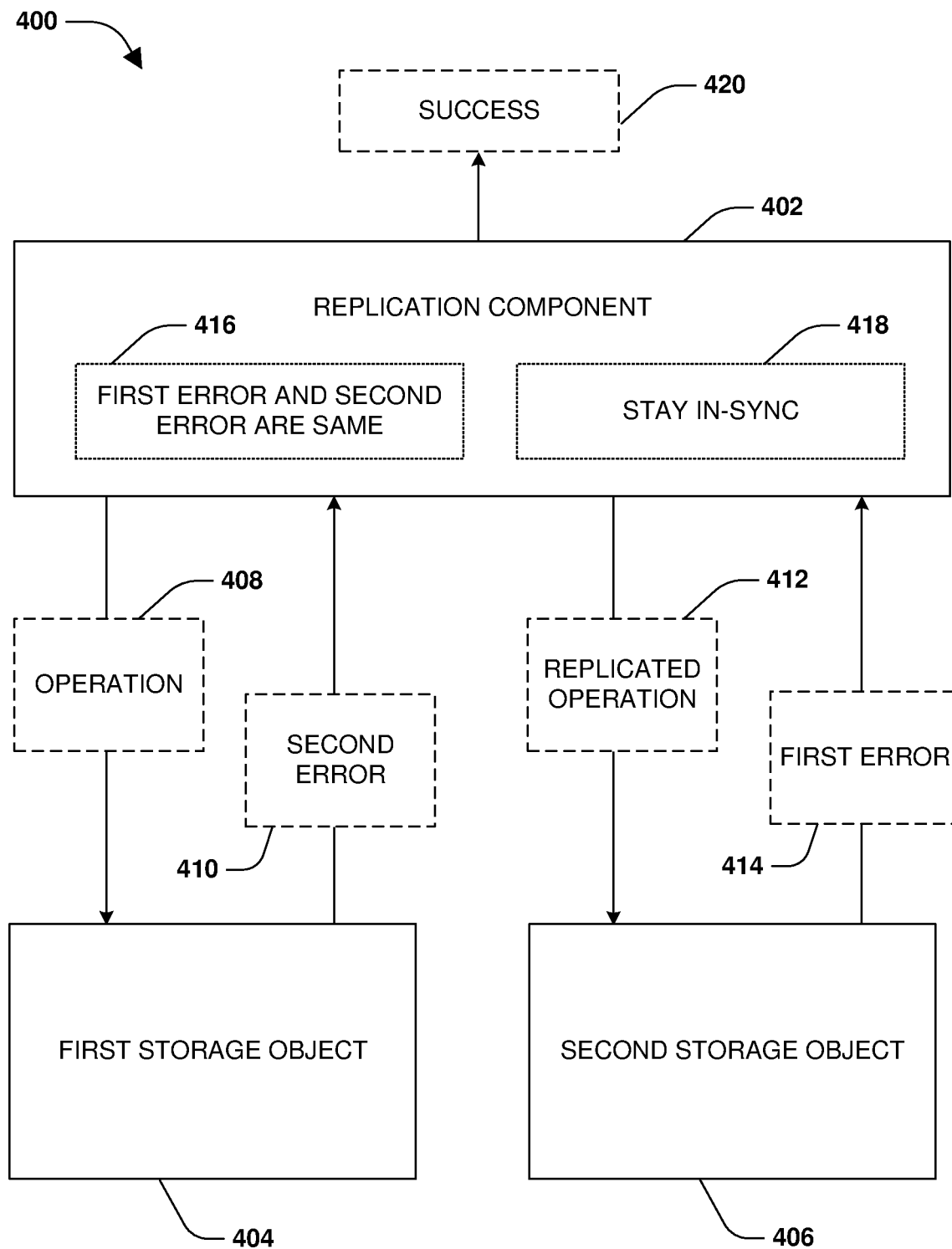
FIG. 4A is a component block diagram illustrating an example system for neutralizing replication errors, where a success response is generated based upon a first error and a second error being the same error.
Figure 4B:
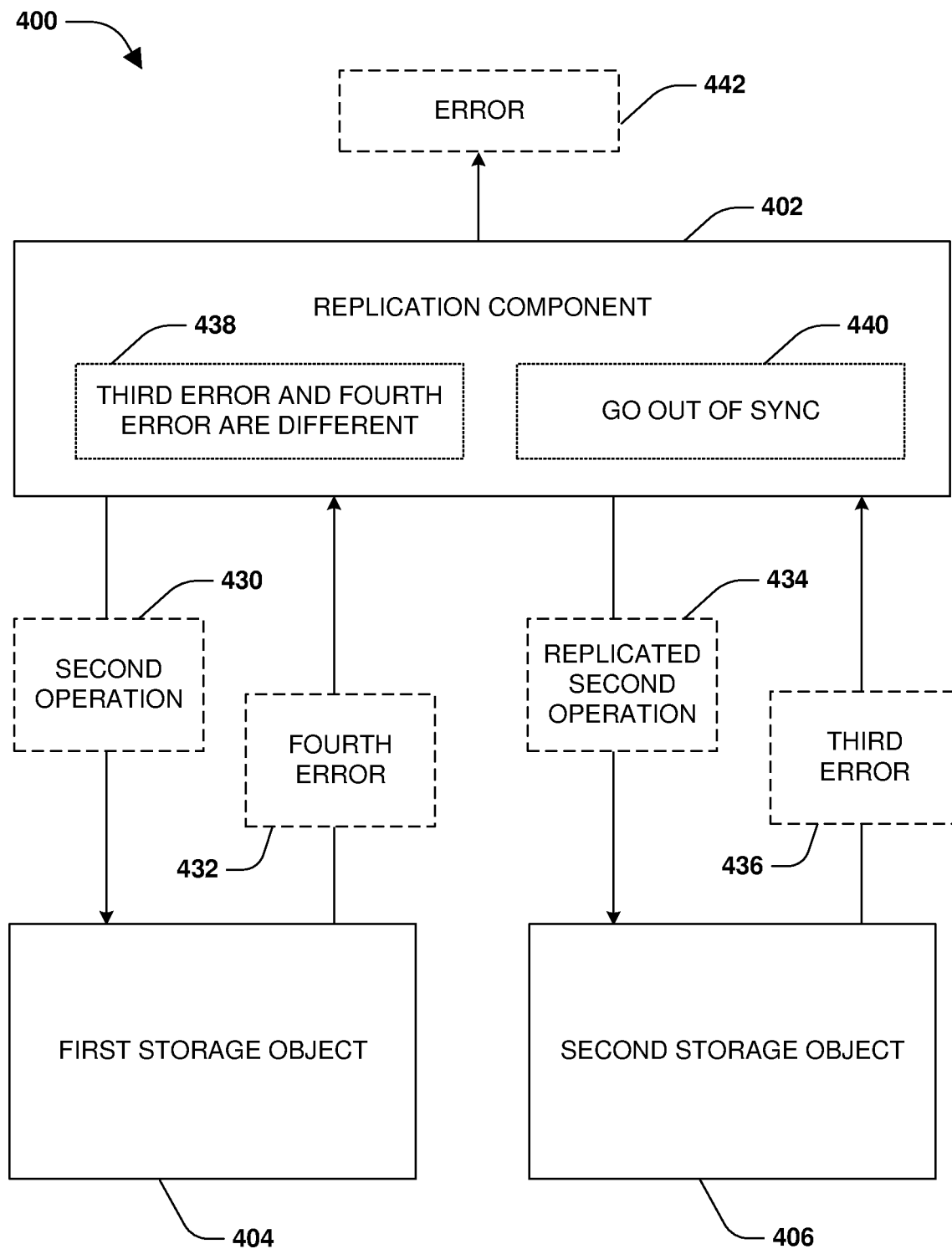
FIG. 4B is a component block diagram illustrating an example system for neutralizing replication errors, where an error response is generated based upon a first error and a second error being different errors.
Figure 5:
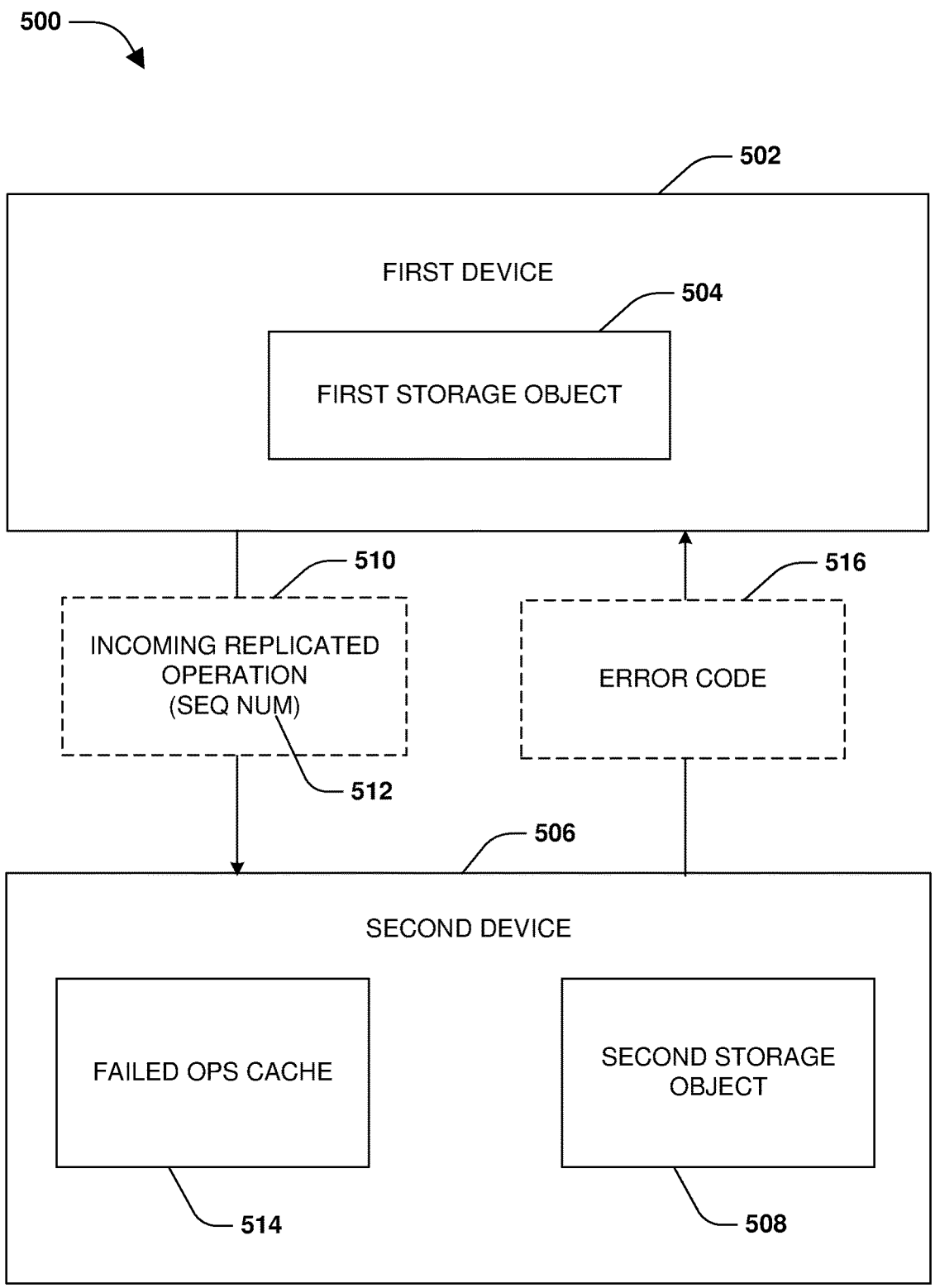
FIG. 5 is a component block diagram illustrating an example system for handling replication errors.

One embodiment of neutralizing replication errors is illustrated by an exemplary method 300 of FIG. 3 and further described in conjunction with system 400 of FIGS. 4A and 4B and system 500 of FIG. 5. A first storage object 404 (e.g., a file, a logical unit number, a storage virtual machine of a plurality of volumes, a directory, a volume, a consistency group of any arbitrary or defined grouping of data, etc.) may be maintained by a first computing environment (e.g., a node, a controller, a cloud computing environment, a cluster of nodes, software as a service, etc.), as illustrated by FIG. 4A. A second storage object 406 may be maintained by a second computing environment. The first storage object 404 and the second storage object 406 may have a synchronous replication relationship where I/O directed to the first storage object 404 are intercepted and split into replicated I/O that ARE replicated to the second storage object 406. In this way, when an operation, such as a write command, targeting the first storage object 404 is received, the operation is executed upon the first storage object 404 and is replicated and executed upon the second storage object 406.

Synchronous replication can provide a zero recovery point objective (RPO) because an operation is not acknowledged as complete until the operation has successfully executed upon the first storage object 404 and has successfully been replicated to the second storage object 406. Unfortunately, various types of errors, such as file system errors, can cause the synchronous replication relationship to be transitioned to an out of sync state, thus losing the zero RPO benefits of being in a synchronous state. However, such errors can occur for both the operation and the replicated operation such that the first storage object 404 and the second storage object 406 are still consistent and have the same data. In these situations, it would be beneficial to not transition the synchronous replication relationship to the out of sync state.

Accordingly, as provided herein, replication errors are handled in a manner such that the synchronous replication relationship is retained in the in-sync state when both an operation and a replicated operation have the same error. At 302, an operation 408 is executed upon the first storage object 404 and is replicated as a replicated operation 412 for execution upon the second storage object 406 by a replication component 402 based upon the synchronous replication relationship being in an in-sync state. The replication component 402 may receive a first error 414 related to the execution of the replicated operation 412 upon the second storage object 406 by the second computing environment. Under normal operation, the replication component 402 would abort the operation 408 and transition the synchronous replication relationship out of sync based upon the first error 414, thus losing the benefits such as zero RPO provided by synchronous replication. However, the replication component 402 is instead configured to refrain from aborting the operation 408 and refrain from transitioning to an out of sync state in response to receiving the first error 414, at 304. Instead, the replication component 402 waits until the operation 408 has completed.

The replication component 402 receives a second error 410 related to the execution of the operation 408 upon the first storage object 404 by the first computing environment. The replication component 402 compares 416 the first error 414 and the second error 410 to determine whether the first error 414 and the second error 410 relate to the same error or different errors, at 306. Because synchronous replication is replicating "live" (not yet acknowledged back to hosts/clients) I/O, file system errors can be encountered such that both the operation 408 and the replicated operation 412 would likely encounter the same file system error. In an example, the file system error may relate to the operation 408 and the replicated operation 412 having stale file handles (e.g., file handles of already deleted files). In another example, the file system error may relate to the operation 408 and the replicated operation 412 attempting to increase a file size of a file beyond a supported file system size.

At 308, the replication component 402 determines that the first error 414 and the second error 410 relate to the same type of error based upon the comparison 416. Accordingly, the replication component 402 maintains 418 the synchronous replication relationship in an in-sync synchronous replication state based upon the first error 414 and the second error 410 relating to the same type of error. The replication component 402 acknowledges 420 the operation 408 and the replicated operation 412 as successfully completing based upon the first error 414 and the second error 410 relating to the same type of error. This is because the same result (same error) occurred for both the operation 408 and the replicated operation 412, and thus the first storage object 404 and the second storage object 406 will have the same state and be consistent.

FIG. 4B illustrates the replication component 402 executing a second operation 430 upon the first storage object 404 and replicating the second operation 430 as a replicated second operation 434 for execution upon the second storage object 406. The replication component 402 receives a third error 436 related to the execution of the replicated second operation 434 upon the second storage object 406 by the second computing environment. Under normal operation, then replication component 402 would abort the second operation 430 and transition the synchronous replication relationship out of sync based upon the third error 436, thus losing the benefits such as zero RPO provided by synchronous replication. However, the replication component 402 is instead configured to refrain from aborting the operation and refrain from transitioning to an out of sync state in response to receiving the third error 436. Instead, the replication component 402 waits until the second operation 430 has completed.

The replication component 402 receives a fourth error 432 related to the execution of the second operation 430 upon the first storage object 404 by the first computing environment. The replication component 402 compares 438 the third error 436 and the fourth error 432 to determine whether the third error 436 and the fourth error 432 relate to the same error or different errors. Based upon the replication component 402 determining that the third error 436 and the fourth error 432 are different types of errors, the replication component 402 transitions 440 the synchronous replication relationship to an out-of-sync state. The replication component 402 returns an error response 442 to the second operation 430. This is because the first storage object 404 and the second storage object 406 could potentially be in different states (e.g., comprise different data) and be inconsistent with respect to one another because the third error 436 and the fourth error 432 are different.

FIG. 5 illustrates a system 500 for handling replication errors. A first device 502 manages a first storage object 504 (e.g., a file, a directory, a logical unit number, a volume, a storage virtual volume of a plurality of volumes, a consistency group of an arbitrary or defined set of data, etc.) having a replication relationship with a second storage object 508 managed by a second device 506. Based upon the replication relationship such as a synchronous replication relationship, operations executed upon the first storage object 504 are replicated as replicated operation for execution upon the second storage object 508. When the first device 502 transmits a replicated operation to the second device 506, then first device 502 may start a timer. If the timer times out before a response is received from the second device 506 for the replicated operation, the first device 502 will retry sending the replicated operation to the second device 506. Sequence numbers may be assigned to replicated operations by the first device 502 in order to uniquely identify and distinguish between replicated operations (e.g., a sequence number may be a monotonically increasing number that is assigned to operations, wherein a sequence number of an operation is also assigned to a replicated operation of that same operation). If a replicated operations is retried, then the same sequence number is used.

The second device 506 is configured to maintain a failed ops cache 514 used to track failed replicated operations that the second device 506 was unable to successfully execute (e.g., replicated operations that returned an error in response to the second device 506 executing the replicated operations upon the second storage object 508). The second device 506 may track sequence numbers of failed replicated operations within the failed ops cache 514. In this way, when an incoming replicated operation is received, the second device 506 can use the failed ops cache 514 to determine whether the incoming replicated operation is a retry of a failed replicated operation.

In an example, the second device 506 receives an incoming replicated operation 510 comprising a sequence number 512. The second device 506 evaluates the failed ops cache 514 to determine whether the sequence number 512 is specified within the failed ops cache 514. For example, the second device 506 determines that the sequence number 512 is mapped to an error code 516 within the failed ops cache 514. Because the sequence number 512 is mapped to the error code 516, the second device 506 can determine that the incoming replication operation 510 is a retry of a failed replicated operation having the same sequence number 512, and that the error code 516 was generated when execution of the failed replicated operation upon the second storage object 508 was attempted. Accordingly, the second device 506 does not execute the incoming replicated operation 510 and instead returns the error code 516, the sequence number 512, and/or other information to the first device 502 as a response to the incoming replicated operation 510.

In an example, a timer is used to clean up entries within the failed ops cache 514, such as after a protocol timeout of an operation so that after the protocol timeout occurs, a host/client is returned with an error. Thus, the first device 502 will only retry operations until the protocol timeout occurs. For example, an entry is removed from the failed ops cache 514 based upon the protocol timer timing out for an operation corresponding to the entry (e.g., the entry has a sequence number of the operation). In this way, an error is transmitted to a client device for the operation.

Figure 6:
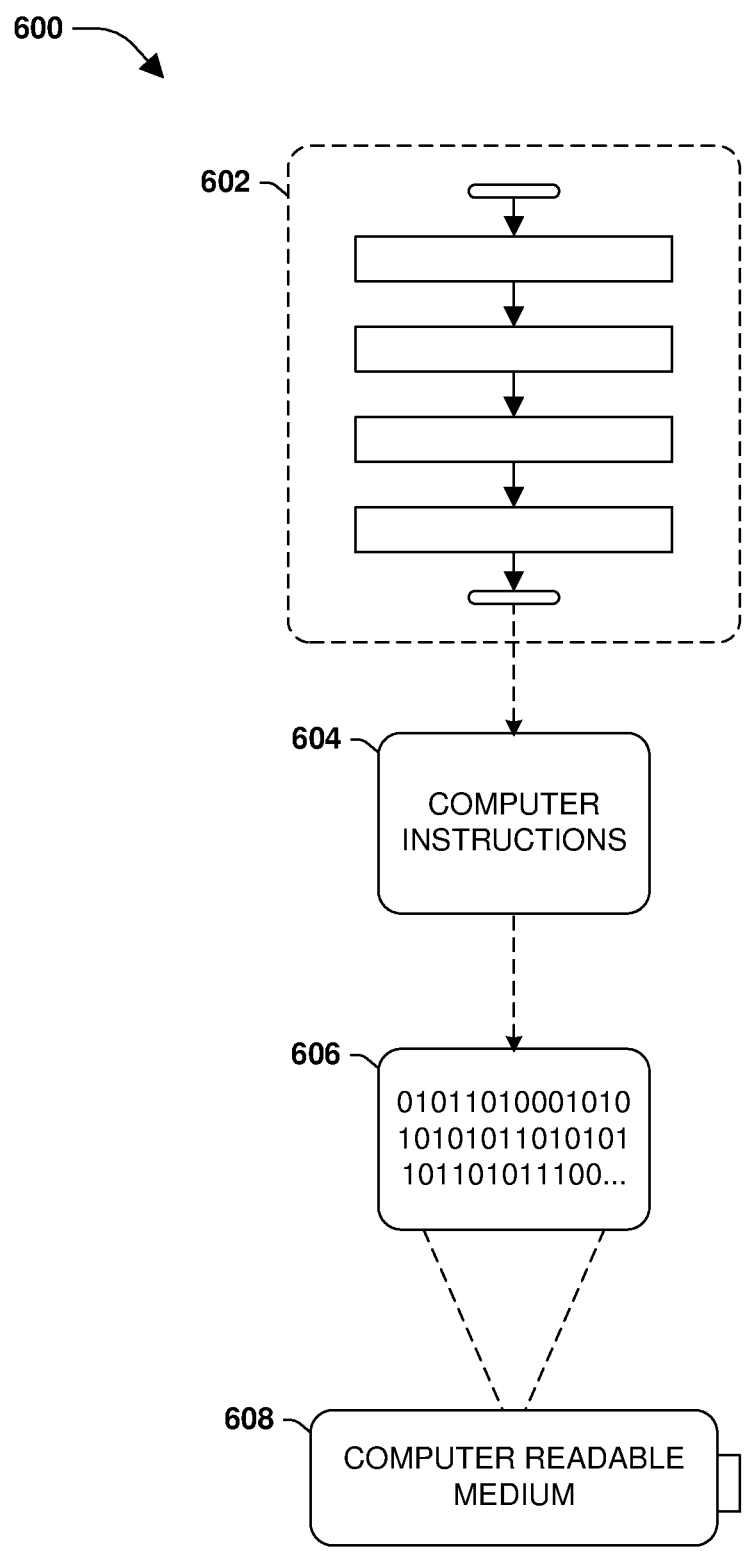
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable computer instructions 604 are configured to implement a system, such as at least some of the exemplary system 400 of FIGS. 4A-4C and/or at least some of the exemplary system 500 of FIG. 5, for example. Many such computer-readable media are contemplated to operate in accordance with the techniques presented herein.

Figure 7:
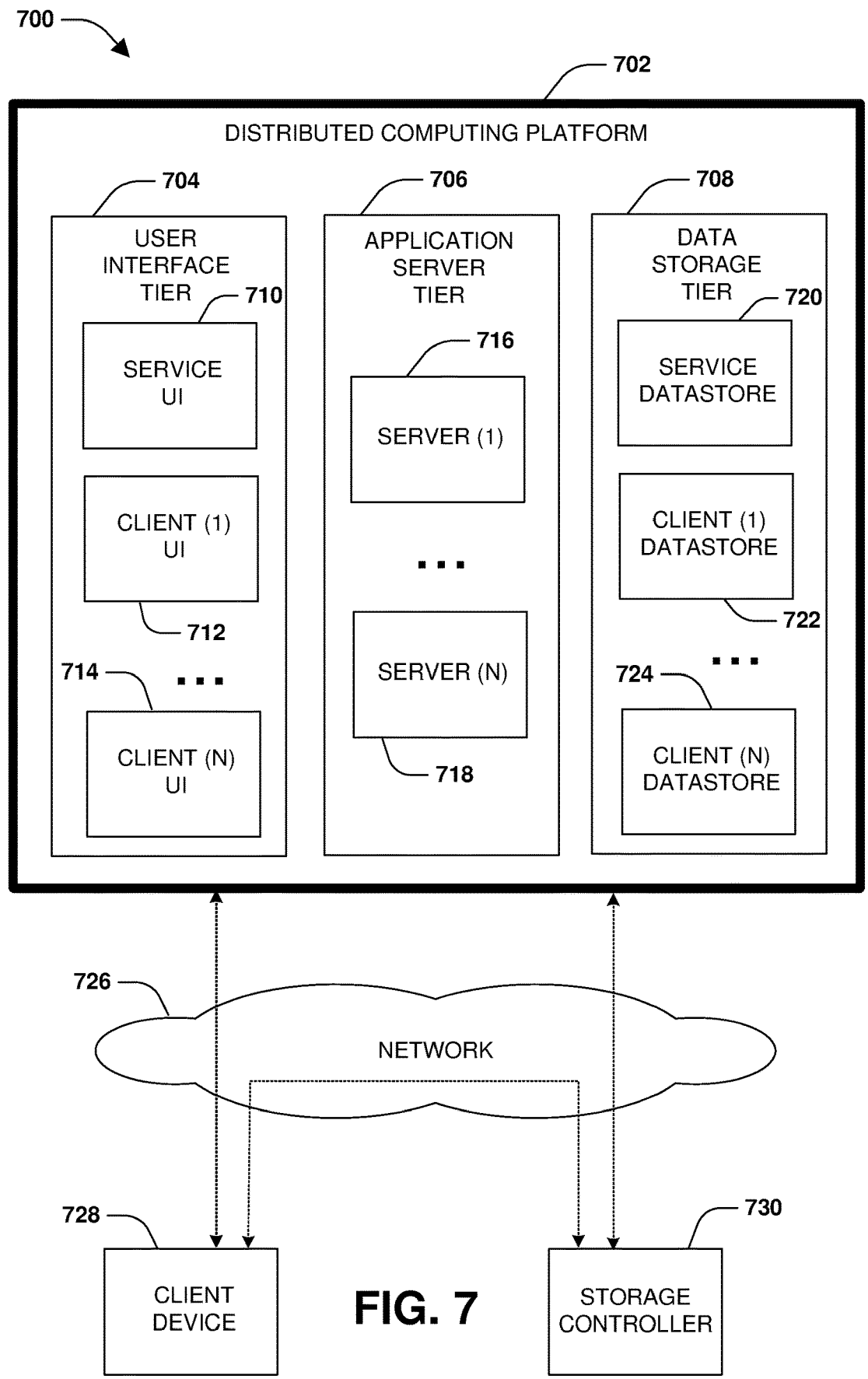
FIG. 7 is a component block diagram illustrating an example computing environment in which an embodiment of the invention may be implemented.

FIG. 7 is a diagram illustrating an example operating environment 700 in which an embodiment of the techniques described herein may be implemented. In one example, the techniques described herein may be implemented within a client device 728, such as a laptop, tablet, personal computer, mobile device, wearable device, etc. In another example, the techniques described herein may be implemented within a storage controller 730, such as a node configured to manage the storage and access to data on behalf of the client device 728 and/or other client devices. In another example, the techniques described herein may be implemented within a distributed computing platform 702 such as a cloud computing environment (e.g., a cloud storage environment, a multi-tenant platform, etc.) configured to manage the storage and access to data on behalf of the client device 728 and/or other client devices.

In yet another example, at least some of the techniques described herein are implemented across one or more of the client device 728, the storage controller 730, and the distributed computing platform 702. For example, the client device 728 may transmit operations, such as data operations to read data and write data and metadata operations (e.g., a create file operation, a rename directory operation, a resize operation, a set attribute operation, etc.), over a network 726 to the storage controller 730 for implementation by the storage controller 730 upon storage. The storage controller 730 may store data associated with the operations within volumes or other data objects/structures hosted within locally attached storage, remote storage hosted by other computing devices accessible over the network 726, storage provided by the distributed computing platform 702, etc. The storage controller 730 may replicate the data and/or the operations to other computing devices so that one or more replicas, such as a destination storage volume that is maintained as a replica of a source storage volume, are maintained. Such replicas can be used for disaster recovery and failover.

The storage controller 730 may store the data or a portion thereof within storage hosted by the distributed computing platform 702 by transmitting the data to the distributed computing platform 702. In one example, the storage controller 730 may locally store frequently accessed data within locally attached storage. Less frequently accessed data may be transmitted to the distributed computing platform 702 for storage within a data storage tier 708. The data storage tier 708 may store data within a service data store 720, and may store client specific data within client data stores assigned to such clients such as a client (1) data store 722 used to store data of a client (1) and a client (N) data store 724 used to store data of a client (N). The data stores may be physical storage devices or may be defined as logical storage, such as a virtual volume, LUNs, or other logical organizations of data that can be defined across one or more physical storage devices. In another example, the storage controller 730 transmits and stores all client data to the distributed computing platform 702. In yet another example, the client device 728 transmits and stores the data directly to the distributed computing platform 702 without the use of the storage controller 730.

The management of storage and access to data can be performed by one or more storage virtual machines (SMVs) or other storage applications that provide software as a service (SaaS) such as storage software services. In one example, an SVM may be hosted within the client device 728, within the storage controller 730, or within the distributed computing platform 702 such as by the application server tier 706. In another example, one or more SVMs may be hosted across one or more of the client device 728, the storage controller 730, and the distributed computing platform 702.

In one example of the distributed computing platform 702, one or more SVMs may be hosted by the application server tier 706. For example, a server (1) 716 is configured to host SVMs used to execute applications such as storage applications that manage the storage of data of the client (1) within the client (1) data store 722. Thus, an SVM executing on the server (1) 716 may receive data and/or operations from the client device 728 and/or the storage controller 730 over the network 726. The SVM executes a storage application to process the operations and/or store the data within the client (1) data store 722. The SVM may transmit a response back to the client device 728 and/or the storage controller 730 over the network 726, such as a success message or an error message. In this way, the application server tier 706 may host SVMs, services, and/or other storage applications using the server (1) 716, the server (N) 718, etc.

A user interface tier 704 of the distributed computing platform 702 may provide the client device 728 and/or the storage controller 730 with access to user interfaces associated with the storage and access of data and/or other services provided by the distributed computing platform 702. In an example, a service user interface 710 may be accessible from the distributed computing platform 702 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 712, a client (N) user interface 714, etc. The client (1) can access various services and resources subscribed to by the client (1) through the client (1) user interface 712, such as access to a web service, a development environment, a human resource application, a warehouse tracking application, and/or other services and resources provided by the application server tier 706, which may use data stored within the data storage tier 708.

The client device 728 and/or the storage controller 730 may subscribe to certain types and amounts of services and resources provided by the distributed computing platform 702. For example, the client device 728 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 730 can establish a subscription to have access to certain services and resources of the distributed computing platform 702.

As shown, a variety of clients, such as the client device 728 and the storage controller 730, incorporating and/or incorporated into a variety of computing devices may communicate with the distributed computing platform 702 through one or more networks, such as the network 726. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 702, such as a multi-tenant business data processing platform or cloud computing environment, may include multiple processing tiers, including the user interface tier 704, the application server tier 706, and a data storage tier 708. The user interface tier 704 may maintain multiple user interfaces, including graphical user interfaces and/or web-based interfaces. The user interfaces may include the service user interface 710 for a service to provide access to applications and data for a client (e.g., a "tenant") of the service, as well as one or more user interfaces that have been specialized/customized in accordance with user specific requirements, which may be accessed via one or more APIs.

The service user interface 710 may include components enabling a tenant to administer the tenant's participation in the functions and capabilities provided by the distributed computing platform 702, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 708 may include one or more data stores, which may include the service data store 720 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 702 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    receiving a replicated operation from a first node that executed an operation from a client upon a first storage object and generated the replicated operation as a replica of the operation for a second node to execute upon a second storage object;
    attempting, by the second node, to execute the replicated operation upon the second storage object; and
    in response to receiving an error associated with execution of the replicated operation:
        determining that the replicated operation is a failed replicated operation; and
        tracking a sequence number of the failed replicated operation within a failed ops cache, used to track failed replicated operations, by creating an entry that maps the sequence number of the failed replicated operation to an error code returned for the failed replication operation.

2. The method of claim 1, wherein the sequence number is assigned to both the operation and the replicated operation.

3. The method of claim 1, comprising:
    returning the error code for an incoming replicated operation having the sequence number mapped within the failed ops cache to the error code.

4. The method of claim 1, wherein the tracking comprises:
    mapping the sequence number to the error code within the failed ops cache.

5. The method of claim 1, comprising:
    returning the error code for an incoming replicated operation having the sequence number mapped within the failed ops cache to the error code, wherein the incoming replicated operation is determined to be a retry of the failed replicated operation tracked within the failed ops cache.

6. The method of claim 1, comprising:
    determining that an incoming replicated operation is a retry of the failed replicated operation tracked within the failed ops cache based upon the incoming replicated operation being assigned the sequence number tracked within the failed ops.

7. The method of claim 1, wherein the tracking comprises:
creating entries, for sequence numbers of failed replicated operations, within the failed ops cache.

8. The method of claim 1, wherein the tracking comprises:
creating entries, mapping sequence numbers to error codes returned for failed replicated operations, within the failed ops cache.

9. The method of claim 1, wherein the tracking comprises:
removing the entry within the failed ops cache based upon a protocol timer timing out.

10. The method of claim 1, comprising:
tracking sequence numbers of failed replicated operations targeting the second storage object within the failed ops cache.

11. A computing device comprising:
a memory comprising machine executable code for performing a method; and
a processor coupled to the memory, the processor configured to execute the machine executable code to cause the processor to:
receive a replicated operation from a first node that executed an operation from a client upon a first storage object and generated the replicated operation as a replica of the operation for a second node to execute upon a second storage object;
attempt, by the second node, to execute the replicated operation upon the second storage object; and
in response to receiving an error associated with execution of the replicated operation:
determine that the replicated operation is a failed replicated operation; and
track a sequence number of the failed replicated operation within a failed ops cache, used to track failed replicated operations, by creating an entry that maps the sequence number of the failed replicated operation to an error code returned for the failed replication operation.

12. The computing device of claim 11, wherein the sequence number is assigned to both the operation and the replicated operation.

13. The computing device of claim 11, wherein the machine executable code causes the processor to:
return the error code for an incoming replicated operation having the sequence number mapped within the failed ops cache to the error code.

14. The computing device of claim 11, wherein the machine executable code causes the processor to:
mapping the sequence number to the error code within the failed ops cache.

15. The computing device of claim 11, wherein the machine executable code causes the processor to:
return the error code for an incoming replicated operation having the sequence number mapped within the failed ops cache to the error code, wherein the incoming replicated operation is determined to be a retry of the failed replicated operation tracked within the failed ops cache.

16. The computing device of claim 11, wherein the machine executable code causes the processor to:
determine that an incoming replicated operation is a retry of the failed replicated operation tracked within the failed ops cache based upon the incoming replicated operation being assigned the sequence number tracked within the failed ops.

17. A non-transitory machine readable medium comprising instructions for performing a method, which when executed by a machine, causes the machine to:
receive a replicated operation from a first node that executed an operation from a client upon a first storage object and generated the replicated operation as a replica of the operation for a second node to execute upon a second storage object;
attempt, by the second node, to execute the replicated operation upon the second storage object; and
in response to receiving an error associated with execution of the replicated operation:
determine that the replicated operation is a failed replicated operation; and
track a sequence number of the failed replicated operation within a failed ops cache, used to track failed replicated operations, by creating an entry that maps the sequence number of the failed replicated operation to an error code returned for the failed replication operation.

18. The non-transitory machine readable medium of claim 17, wherein the instructions cause the machine to:
track sequence numbers of failed replicated operations targeting the second storage object within the failed ops cache.

19. The non-transitory machine readable medium of claim 17, wherein the instructions cause the machine to:
determine that an incoming replicated operation is a retry of the failed replicated operation tracked within the failed ops cache based upon the incoming replicated operation being assigned the sequence number tracked within the failed ops.

20. The non-transitory machine readable medium of claim 17, wherein the instructions cause the machine to:
remove the entry within the failed ops cache based upon a protocol timer timing out.

\* \* \* \* \*